(12) United States Patent
Reniau

(10) Patent No.: US 6,739,786 B2
(45) Date of Patent: May 25, 2004

(54) BALL JOINT BEARING BLOCK LUBRICATION DEVICE

(75) Inventor: Grégory Reniau, Tournefeuille (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/288,714

(22) Filed: Nov. 5, 2002

(65) Prior Publication Data

US 2003/0085321 A1 May 8, 2003

(30) Foreign Application Priority Data

Nov. 8, 2001 (FR) .......................................... 01 14449

(51) Int. Cl.$^7$ ................................................ F16C 11/00
(52) U.S. Cl. ........................ 403/39; 403/122; 403/123

(56) References Cited

U.S. PATENT DOCUMENTS

| | | | |
|---|---|---|---|
| 1,693,748 A | 12/1928 | Fiegel et al. .................. 403/120 |
| 4,143,983 A | * 3/1979 | McEowen ..................... 403/39 |
| 4,576,488 A | 3/1986 | Steiner et al. ............... 384/291 |
| 4,858,962 A | * 8/1989 | Bolling et al. ............ 285/121.7 |
| 4,971,473 A | * 11/1990 | Schafer et al. ............... 403/140 |
| 5,226,754 A | * 7/1993 | Dumbrava .................... 403/125 |
| 5,247,873 A | 9/1993 | Owens et al. .................. 92/157 |
| 5,435,652 A | 7/1995 | Howard ........................ 384/99 |
| 5,816,731 A | 10/1998 | Howard ...................... 403/120 |
| 6,145,625 A | 11/2000 | Prokop et al. .............. 184/27.1 |

FOREIGN PATENT DOCUMENTS

DE 203 475 10/1983 .............. B04B/9/12

* cited by examiner

*Primary Examiner*—J. Woodrow Eldred
(74) *Attorney, Agent, or Firm*—Thelen Reid & Priest, LLP

(57) ABSTRACT

Lubrication device for a ball joint bearing block.

The device comprises at least one reservoir grease (30), a pump (34) capable of circulating grease between the reservoir and at least one bearing block lubrication groove (28), and a system (36) designed to actuate the pump (34) at every rotation movement of a hinge pin (16) of the bearing block. Preferably, there is a first groove (28) between the cage (24) and the ball (22) of the ball joint, and a second groove between the ball (22) and the hinge pin (16). Each rotation of the hinge pin (16) thus alternately controls injection of grease into one of the two grooves. One preferred application is lubrication of the hinge pins of aircraft landing gear.

13 Claims, 3 Drawing Sheets

US 6,739,786 B2

BALL JOINT BEARING BLOCK LUBRICATION DEVICE

TECHNICAL FIELD

The invention relates to a device designed for lubrication of a bearing block with a ball joint.

More precisely, the invention relates to a device to automatically lubricate a ball joint in a closed circuit, during rotation movements of a hinge pin supported by the bearing block.

The invention is particularly but not exclusively applicable to bearing blocks supporting landing gear on the structure of an aircraft. In this case, lubrication is done during landing gear extension and retraction movements.

STATE OF THE ART

An aircraft retractable landing gear comprises several parts, such as the main fitting of the landing gear and the strut, that are equipped with a number of hinge pins fixed in rotation to the aircraft structure, in order to define the same number of rotation axes (for example two axes of rotation in the transverse direction relative to the aircraft). These axes of rotation define a down and up movement for the landing gear, in the case of the aircraft landing gear.

The connection between the different hinge pins in the landing gear and the aircraft structure is frequently defined by the use of bearing blocks fitted with ball joints. These ball joints enable the different hinge pins in the landing gear to add pivoting movements with respect to the aircraft structure, in addition to rotation movements allowed by the different axes of rotation. These pivoting means, also called "swiveling phenomenon", cause slight rotations of the landing gear about two other axes of rotation that define an orthogonal system with the axis of rotation considered.

The swiveling phenomenon occurs for example when deformations of the aircraft structure take place. These deformations take place particularly during maneuvers on the ground (taxiing) or during some flight phases during which high stresses may be applied to the said structure.

The ball joints in these ball joint bearing blocks usually comprise a ball capable of pivoting into a cage. One procedure for manufacturing such a ball joint is described in document U.S. Pat. No. 1,693,748; The cage in this ball joint is made from a single piece, one end of which is machined to the required shape before the ball is inserted into the said cage. An annular protuberance is formed on the outside of the cage, at its second end. This second end of the cage is then deformed by inserting the said cage by force fitting it into its support. This has the effect of creating the final shape of the cage and enclosing the ball inside it.

This process becomes difficult to implement when the dimensions of the ball joint are large. In this case, the cage may be composed of two secondary half cages inserted in a cylindrical primary cage to enable assembly of the ball.

The above mentioned deformations of the aircraft structure may cause relative movements between the ball and the cage, corresponding to the swiveling phenomenon already mentioned, and translation displacements, or even slight rotations, at the hinge pin at the inside of the ball, if the said hinge pin is not fixed inside the ball.

These displacements under load have the effect of applying friction forces on the bearing block ball joints. These friction forces are particularly high if the loads producing the deformations are high and if the friction coefficient between the surfaces is bad. From this point of view, it is known that the coefficient of friction varies particularly as a function of the materials present and the lubrication.

Friction forces can create a resisting torque between the ball and the cage that can prevent the ball joints from fulfilling their function entirely to compensate for deformations. Friction forces may also make it impossible for the hinge pin to rotate within the ball under satisfactory conditions, when a torque and/or axial forces are applied to the said hinge pin.

These phenomena can sometimes cause damage to landing gear hinge pins, for example due to occurrence of local overstresses at the ends of the bearing block, due to bending of the hinge pin that causes a longitudinal misalignment of the hinge pin in the bearing block.

These phenomena may also cause rotation of the secondary half cages in the primary cage. This rotation causes misalignment of the lubrication orifices and lubrication grooves. The result is that grease can no longer be replaced in the said grooves, which can have the consequence of causing damage to insufficiently lubricated surfaces, in other words damage to the ball joint.

Finally, the phenomena caused by friction forces may also cause damage to the fittings forming the structural parts of the landing gear, when torques and parasite forces have been applied to them.

These various problems are particularly sensitive when deformations of the aircraft structure are large. Frequently, these deformations themselves increase with the flexibility of the aircraft, which is usually higher for large aircraft. In this case, the above mentioned problems related to friction forces need special attention.

One known technique of reducing friction forces consists of lubricating firstly the contact surfaces between the ball and the bearing block cage in which this ball fits, and secondly contact surfaces between the hinge pin of the landing gear and the reaming made in the ball into which this hinge pin fits; This lubrication is done by injecting grease between the said contact surfaces during maintenance operations.

More precisely, surfaces to be lubricated are usually provided with grooves or slots in which grease can circulate and can therefore be distributed over these surfaces. Grease is injected under pressure using a pump, through grease nipples connected to the grooves. Old grease is expelled from the grooves through appropriate orifices.

Maintenance operations are usually carried out approximately every 500 hours of operation of the landing gear, corresponding to intervals of about 4 months for a medium haul aircraft, under normal operating conditions.

This technique for the renewal of grease used to lubricate ball joint bearing blocks in aircraft landing gear introduces several problems.

Thus, we have seen that the grease is only renewed periodically after a number of operations of the landing gear between two maintenance operations. Therefore, the grease ages, which is usually accompanied by a deterioration to its lubrication properties. This degradation is worsened by pollution, temperature and pressure variations, etc.

Furthermore, if the quantity of new grease injected during a maintenance operation is insufficient, it is possible that not all old grease will be expelled from the lubricated surfaces. In this case, lubrication of the said surfaces will not be as good because the old grease will remain mixed with new grease. This situation is particularly likely, since old grease can sometime block up the grooves, preventing it from being entirely replaced by new grease.

Furthermore, after a number of operations of the landing gear, some of the grease is expelled on the edges of the lubricated surfaces. Therefore, lubrication of these surfaces is not as good due to the lack of grease.

PRESENTATION OF THE INVENTION

Specifically, the purpose of the invention is a device for lubrication of a ball joint bearing block, with an innovative design such that it renews grease between the contact surfaces at every rotation of the hinge pin, in a closed circuit, particularly to limit aging of the grease, the risk of no grease being present and the risk of the grooves being blocked by old grease, in order to improve the lubrication quality and reduce grease consumption.

According to the invention, this result is achieved by means of a device for lubrication of a ball joint bearing block comprising a pivot hinge pin, the device comprising at least one lubrication groove for the ball joint bearing block, characterized in that the device also comprises a lubricant reservoir connected through a closed circuit to the groove, pumping means designed to circulate the lubricant in the circuit between the reservoir and the groove, and means of activating the pumping means under the effect of a rotation movement of the pivot hinge pin.

This device renews the lubricant, in other words usually grease, between the lubricated surfaces of the bearing block during each rotation of the pivot hinge pin. Therefore, depending on the capacity of the reservoir, grease is therefore used much less frequently than if a lubrication device according to prior art is used. This limits aging and consequently improves the lubrication quality.

Furthermore, since grease frequently circulates in the grooves, the obstruction of grooves by old grease is much less probable than when a device according to prior art is used.

Furthermore, since the pumping means inject grease into the grooves during each rotation of the pivot hinge pin, there is no longer any risk of poor lubrication of contact surfaces due to lack of grease, as is possible with a device according to prior art.

Furthermore, the device according to the invention is capable of renewing grease in a closed circuit. Therefore, grease consumption is limited to the renewal of grease during periodic maintenance operations.

In one preferred embodiment of the invention, the device comprises at least two lubrication grooves and means of cyclically distributing the lubricant to each of the said grooves, during successive rotation movements of the pivot hinge pin.

Advantageously, the pumping units comprise a piston free to move in a given direction inside the lubricant reservoir, in order to divide the reservoir into a number of variable volume chambers.

In this case, a first of the said chambers is advantageously connected to a first end of a first groove through a first safety valve, the second chamber is connected to the second end of the first groove through a second safety valve provided with non-return means, the second chamber is connected to a first end of a second groove through a third safety valve and the first chamber is connected to the second end of the second groove through a fourth safety valve fitted with non-return means.

In general, the ball joint bearing block comprises a ball joint cage, a ball joint ball mounted in the ball joint cage and the said pivot hinge pin which passes through a reaming formed in the ball joint ball. The first groove is then formed between the ball joint cage and the ball joint ball and the second groove is formed between the ball joint ball and the pivot hinge pin.

Preferably, first leak tightness means are provided between the ball joint cage and the ball joint ball, on each side of the first groove, and second leak tightness means are provided between the ball joint ball and the pivot hinge pin, on each side of the second groove.

To enable replacement of grease during maintenance operations, a passage for injection of new grease advantageously joins a first grease nipple to the first end of the first groove and a passage for expulsion of old lubricant connects the first chamber to a second grease nipple.

In one advantageous variant embodiment, the two chambers with variable volume are connected to a compensation chamber that contains lubricant kept under pressure by appropriate means, such as a second piston. This variant can reduce the dimensions or use seals with lower sealing characteristics.

In the preferred embodiment of the invention, the lubricant reservoir and the mobile piston are preferably housed inside the pivot hinge pin, so that its center line is coincident with the center line of the pivot hinge pin.

In the latter case, the means of actuating the pumping means advantageously include a connecting rod, the first end of which is hinged on the piston at a location eccentric from the said common center line, and a second end of which is hinged on a structure fixed to the bearing block cage at a location that is also offset from the said common center line.

According to one preferred non-limitative application of the invention, the pivot hinge pin forms part of an aircraft landing gear.

Successive operations to retract and extend the landing gear then cause successive rotations of the pivot hinge pin in one direction or the other, with the effect of injecting lubricant alternately into the first groove and the second groove.

BRIEF DESCRIPTION OF THE DRAWINGS

We will now describe one preferred embodiment of the invention for illustrative purposes that is in no way limitative, with reference to the attached drawings in which.

DETAILED DESCRIPTION OF A PREFERRED EMBODIMENT ACCORDING TO THE INVENTION

The embodiment illustrated on the figures is particularly applicable to lubrication of ball joint bearing blocks used on pivot hinge pins through which a retractable aircraft landing gear is articulated on the structure of this aircraft.

However, it will be observed that the invention is not limited to this application and that it may be used in all cases in which a pivot or rotation hinge pin is supported by a structure such that rotation movements of the said axis are sufficiently slow to enable suitable circulation of grease.

Figure 1:
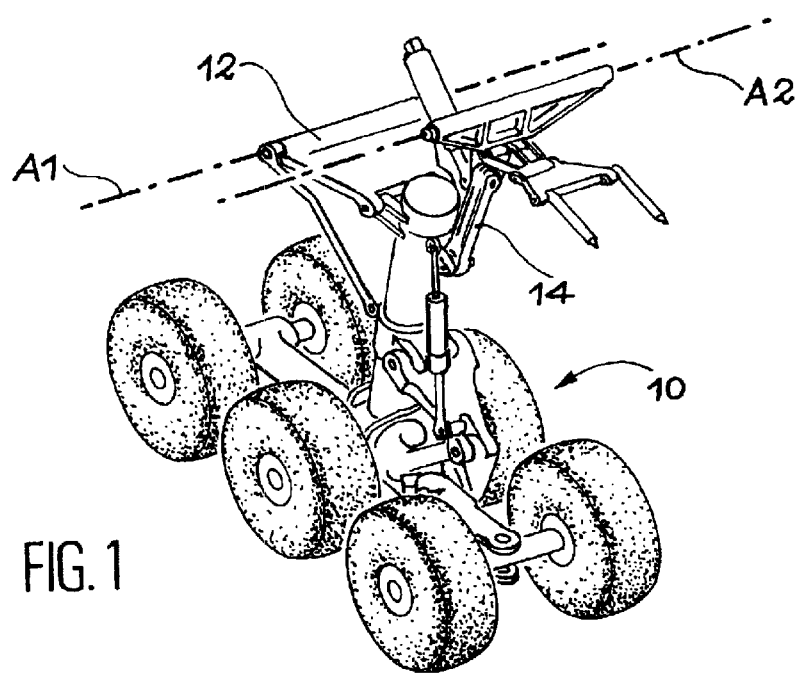
FIG. 1 shows a perspective view that diagrammatically shows an aircraft landing gear with pivot hinge pins installed on ball joint bearing blocks that could be equipped with lubricant devices according to the invention.

As shown diagrammatically, for example in FIG. 1, the connection between a retractable landing gear of the aircraft 10 and the structure (not shown) of this aircraft comprises a number of pivot or rotation hinge pins. In the case shown in FIG. 1, the connection comprises two pivot hinge pins, but only the center lines of these hinge pins are shown in A1 and A2.

Each of these pivot hinge pins is fixed to a part of the landing gear 10, such as the main fitting 12 or the strut 14. The connection between each pivot hinge pin and the aircraft structure is made by bearing blocks fitted with ball joints. One of these bearing blocks is shown diagrammatically in FIG. 2.

Figure 2:
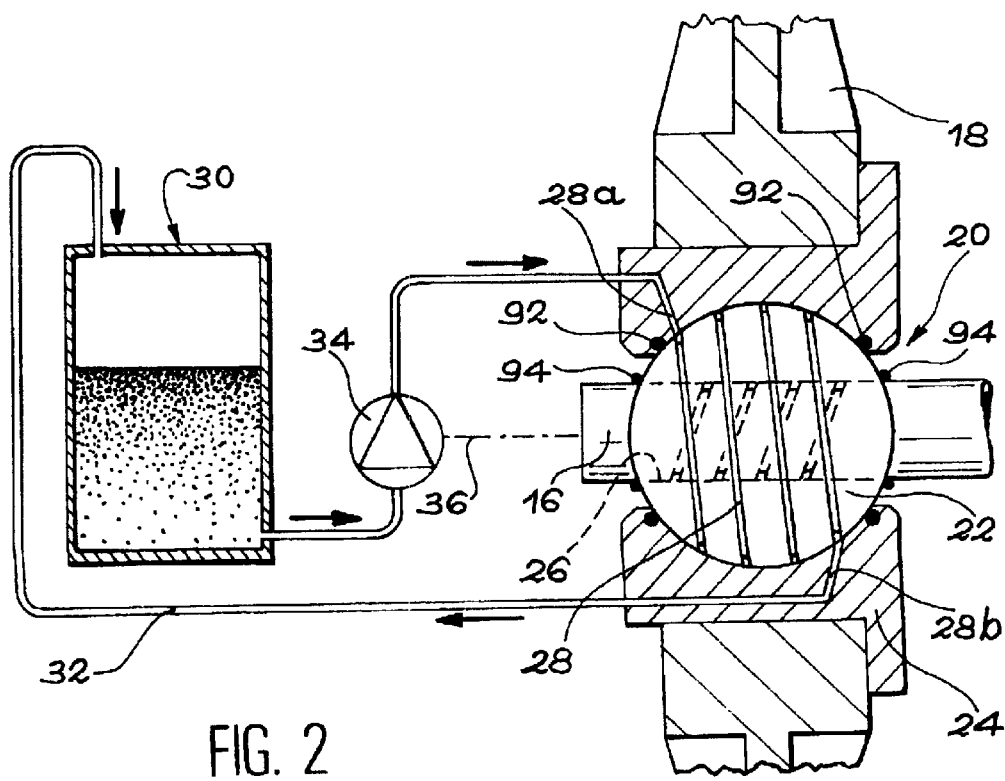
FIG. 2 is a scheme that illustrates the operating principle of the lubrication device according to the invention.

More precisely, FIG. 2 diagrammatically shows the end of a pivot hinge pin 16, fitted in a part of the structure 18 of the aircraft through a bearing block 20 comprising a ball joint. The ball joint itself is composed of a ball 22 installed free to rotate in a cage 24.

A reaming 26 in which the pivot hinge pin 16 is installed passes through the ball 22. The outside surface of the ball 22 comprises a spherical part which is in contact with a matching inside surface of the cage 24. This surface itself is fixed in a structural part 18 of the aircraft.

Swivel movements of the bearing block occur between the matching spherical surfaces of the ball 22 and the cage 24. Therefore, these surfaces need to be lubricated.

Lower amplitude relative translation and possibly rotation movements also occur between the cage 24 and the pivot hinge pin 16. Therefore, the surfaces of the two parts in contact need to be lubricated.

In the preferred embodiment shown in the figures, these various contact surfaces are lubricated by a lubrication device according to the invention.

As shown diagrammatically in FIG. 2, this device comprises at least one groove 28 formed on the spherical surfaces in contact with the ball 22 and the cage 24. For example, this groove is in the shape of a spiral that passes between the said surfaces. It may be machined in one and/or both of these surfaces.

According to the invention, the lubrication device also comprises a lubricant reservoir 30, which is connected to each of the ends of the groove 28 by a closed circuit 32. This circuit 32, and the reservoir 30 and the groove 28 are filled with a high viscosity lubricant such as grease. Pumping means 34 are placed in the circuit 32, so as to circulate the lubricant in the said circuit between the reservoir 30 and the groove 28.

The lubrication device according to the invention also comprises means of actuating pumping means 34 under the effect of a rotation movement of the pivot hinge pin 16. These actuation means are diagrammatically illustrated by the chain dotted line in FIG. 2. They may be in different forms (connecting rod, belt, generating line, etc.) without departing from the scope of the invention.

In the lubrication device conform with the invention, the rotation movements of the pivot hinge pin 16 that occur as the landing gear is extended or retracted, have the effect of actuating the pumping means 34 through the actuation means 36. The pumping means 34 then send the lubricant from the reservoir 30 to a first end 28a of the groove 28. The lubricant thus injected pushes the lubricant already contained in the groove 28, thus forcing the lubricant to circulate inside the groove. The surplus lubricant is ejected through the second end 28b of groove 28, from where it is sent to the reservoir 30. Therefore, the device operates in a closed circuit.

Figure 3:
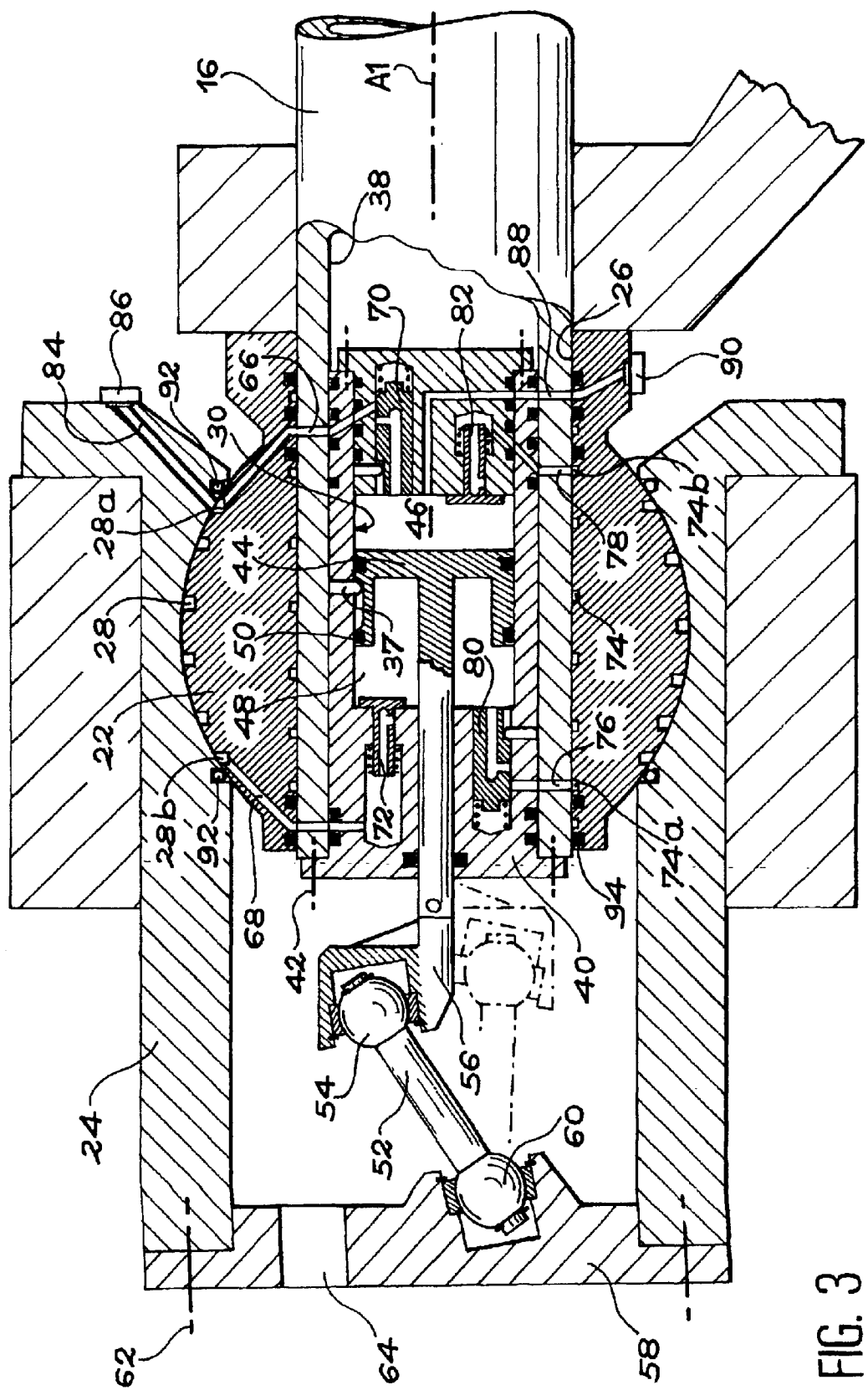
FIG. 3 is a longitudinal sectional view that illustrates a preferred embodiment of the lubrication device according to the invention, integrated in a pivot hinge pin of the landing gear of an aircraft.

FIG. 3 shows a preferred embodiment of the invention, in which the reservoir 30 is integrated inside the pivot hinge pin 16. The embodiment in FIG. 3 is also different from the diagrammatic representation in FIG. 2, due to the fact that it also lubricates contact surfaces between the ball 22 in the ball joint and the pivot hinge pin 16. More precisely, and as will be described in more detail later, the lubrication device is arranged such that successive rotations of the pivot hinge pin 16 in each direction, due to extension and retraction movements of the landing gear, have the effect of alternately injecting lubricant between the ball 22 and the cage 24 of the ball joint, and between the hinge pin 16 and the ball 22.

In the embodiment illustrated in FIG. 3, the pivot hinge pin 16 is hollow and a reaming 38 passes through its entire length. The reservoir 30 is formed from a cylindrical part 40 that fits into the reaming 38, at one of the ends of the hinge pin 16. The part 40 is fixed in hinge pin 16 by screws (symbolically illustrated by chain dotted lines 42) that pass through a collar formed on the cylindrical part 40, to screw into the end of the pivot hinge pin 16.

The reservoir 30 is materialized by a cylindrical cavity formed in the part 40. This cavity is centered on the center line A1 of the pivot hinge pin 16.

The pumping means 34 in FIG. 2 are materialized by a piston 44 installed on the inside of the reservoir 30 so as to be able to slide along its center line A1, while remaining prevented from rotating, for example by means of split pin 37. The piston 44 divides the reservoir 30 into two chambers 46 and 48. Seals 50 fitted on piston 44 make a leak tight separation between these two chambers 46 and 48.

The actuation means 36 in FIG. 2 are materialized mainly by a connecting rod 52. A first end of this connecting rod 52 is connected through an articulation 54 to the end of a rod 56 fixed to the piston 44. More precisely, the rod 56 passes through the part 40 in a leak tight manner along the center line A1. Furthermore, the end of the rod 56 located on the outside of the pivot hinge pin 16 is connected to the connecting rod 52 through the articulation 54 at an eccentric position, in other words offset laterally from the center line A1.

The second end of the connecting rod 52 is articulated on an end plate 58 fixed to the aircraft structure, through a second articulation 60. More precisely, the end plate 58 is fixed by screws (diagrammatically illustrated by chain dotted lines 62 in FIG. 3) at the end of a continuation of cage 24 of the bearing block ball joint. The articulation 60 is also located at an eccentric position from the center line A1. Holes 64 are provided in the end plate 58 so that the screws 42 can be turned without needing to take off the said end plate.

FIG. 3 shows the lubrication groove 28 for the contact surfaces between the ball 22 and the cage 24 of the ball joint which is formed on the outer surface of the ball 22.

The closed circuit 32 that connects the reservoir 30 to this groove 28 is materialized by a first passage 66 that creates a communication between the chamber 46 and the first end 28a of the groove 28, and by a second passage 68 that creates a communication between the second end 28b of the groove 28 and the chamber 48. Each of these passages 66 and 68 passes through the part 40, the pivot hinge pin 16 and the ball 22.

The end of the first passage 66 located in the part 40 opens up in chamber 46 through a first valve 70. This first valve 70 normally isolates the chamber 46 from the passage 66. On the other hand, it sets up a communication between the chamber 46 and the passage 66 while the piston 44 moves along the center line A1 so as to reduce the volume of chamber 46 and to increase the volume of chamber 48, in other words towards the right in FIG. 3.

The end of the second passage 68 located in the part 40 opens up into the chamber 48 through a second valve 72. This second valve is provided with a non-return valve. It prevents lubricant from passing from the chamber 48 to the second passage 68, while enabling circulation of lubricant in the reverse direction.

In order to enable lubrication of the contact surfaces between the ball 22 and the pivot hinge pin 16, a second groove 74 is machined in the reaming that passes through the ball 22. For example, this groove follows a spiral path between a first end 74a and a second end 74b.

A second closed circuit connects the reservoir 30 to the second groove 74. This second circuit comprises a third passage 76 that puts the chamber 48 into communication with the first end 74a of groove 74 and a fourth passage 78 that puts the second end 74b of the groove 74 into communication with the chamber 46. Each of the passages 76 and 78 passes through the part 40 and the pivot hinge pin 16.

The end of the third passage 76 located in the part 40 opens up in the chamber 48 through a third valve 80. This third valve 80 normally isolates the chamber 48 from the passage 76. On the other hand, it sets up a communication between the chamber 48 and the passage 76 when the piston 44 moves along the center line A1 in the direction tending to reduce the volume of the chamber 48 and to increase the volume of chamber 46, in other words towards the left in FIG. 3.

The end of the fourth passage 78 located in the part 40 opens up in the chamber 46 through a fourth valve 82. This fourth valve is provided with a non-return valve. It prevents lubricant from passing from the chamber 46 to the fourth passage 78, while enabling lubricant to circulate in the reverse direction.

In order to complete the description, FIG. 3 shows that a fifth passage 84 passes through the ball 24 in order to connect the first end 28a of the first groove 28 to a first grease nipple 86 accessible from outside the ball joint bearing block. Similarly, a sixth passage 88 passes through the part 40, the pivot hinge pin 16 and the ball 22, in order to connect the second end 74b of the second groove 74 to a second grease nipple 90, accessible from the outside of the ball joint bearing block. The grease nipples 86 and 90 are closed during normal operation.

When the lubrication device is in working condition, the two chambers 46 and 48 of the reservoir 30, and the grooves 28 and 74 and passages 66, 68, 76, 78, 84 and 88 are normally filled with a high viscosity lubricant such as grease.

Advantageously, sealing joints 92, such as double-lip seals, are provided around the periphery of contact surfaces between the ball 22 and the cage 24 of the ball joint. Similarly, seals 94 such as four-lobe seals are used to make rotation and translation movements of the pivot hinge pin 16 and are provided at the periphery of the contact surfaces between this hinge pin 16 and the ball 22 of the ball joint.

Seals 92 and 94 are sized to resist the lubricant pressure generated by displacements of piston 44. They limit lubricant leaks that may occur around the periphery of the said surfaces under the effect of this pressure. Thus, the volume of air that can enter grooves 28 and 74 and/or chambers 46 and 48 between two lubricant replacement operations is sufficiently low compared with the piston movements, for displacements of the said piston to cause satisfactory circulation of the lubricant, and not only compression of the said air volume.

In one variant embodiment of the invention (not shown), the lubrication device also comprises a compensation chamber containing lubricant under pressure. This compensation chamber is connected to the two chambers 46 and 48 of the reservoir 30, so as to automatically inject lubricant from the compensation chamber into the said chambers 46 and 48 when lubricant losses at seals 92 and 94 tend to reduce the volume of the lubricant contained in chambers 46 and 48.

As a non-limitative example, the pressure of the lubricant in the compensation chamber may be maintained by a second piston located in the said compensation chamber. This second piston is then actuated by a spring, for which the coefficient of elasticity is sufficiently high so that the second piston applies the required pressure on the lubricant.

This variant embodiment prevents air from entering chambers 46 and 48. Therefore it enables use of a piston 44 with a shorter stroke than is possible in the previously described embodiment. Therefore the size of the lubrication device can be reduced.

This variant embodiment also makes it possible to use seals 92 and 94 for which the sealing characteristics are not as good as in the previously described embodiment.

When the landing gear is retracted, the different moving parts of the lubrication device occupy the positions shown in FIG. 3. As shown diagrammatically in FIGS. 4A and 4B, the articulations 54 and 60 of the connecting rod 52 are then at angular spacing from each other around the center line A1, such that the piston 44 occupies a first extreme position corresponding to the smallest possible volume of the chamber 48 and to the largest possible volume of chamber 46.

Figure 4A:
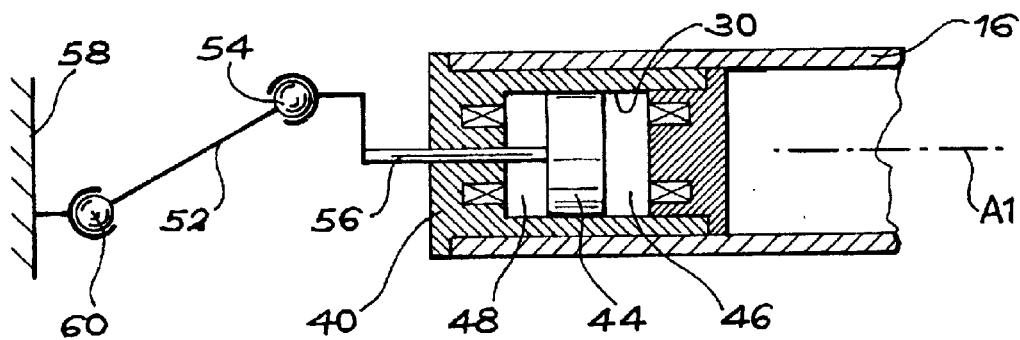
FIGS. 4A and 4B are diagrammatic views showing longitudinal and end views respectively, representing the lubrication device in FIG. 3 in a position corresponding to the retracted state of the landing gear.
Figure 4B:
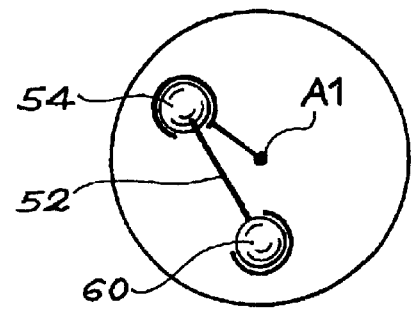
Figure 5A:
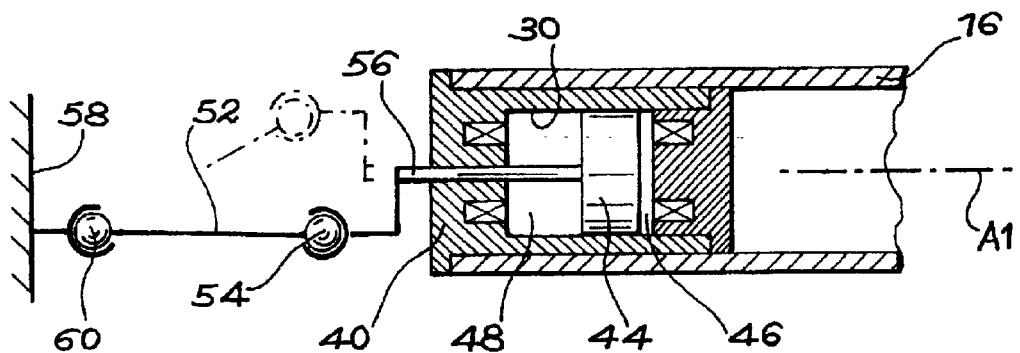
FIGS. 5A and 5B are views similar to FIGS. 4A and 4B showing the lubrication device in FIG. 3 in a position corresponding to the extended state of the landing gear.
Figure 5B:
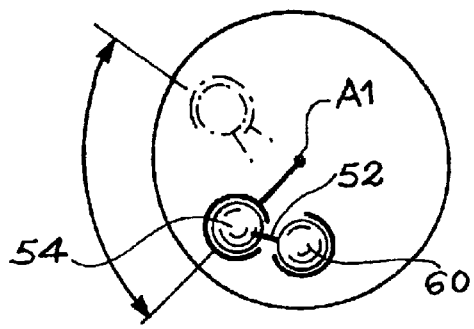

As shown diagrammatically in FIGS. 5A and 5B, a landing gear extension movement has the effect of turning the pivot hinge pin 16 by a given angle (for example about 78°) in the anti-clockwise direction shown in FIGS. 4B and 5B. The effect of this rotation is to reduce the angular spacing between the articulation 54 and the articulation 60. Consequently, the connecting rod 52 pushes the piston 44 towards the right, as seen in FIGS. 3, 4A and 5A. This movement of piston 44 results in a reduction in the volume of the chamber 46 and an equivalent increase in the volume of the chamber 48.

The reduction in the volume of chamber 46 has the effect of forcing a certain volume of lubricant contained in chamber 46, to the first end of the first groove 28, through the first valve 70. An equal volume of lubricant previously contained in the groove 28 is forced into the chamber 48 through the second valve 72.

On the other hand, the extension movement of the landing gear has no effect on the lubricant contained in the second groove 74. The non-return valve of the fourth valve 82 then opposes any lubricant circulation from the chamber 46 to the second groove 74.

During the landing gear retraction movement following the extension movement, the pivot hinge pin 16 rotates about its geometric center line A1 by an angle equal to and opposite the previous rotation angle. Thus, the pivot hinge pin 16 rotates by the said angle (for example about 78°) in the clockwise direction as seen in FIGS. 4B and 5B. The result is a displacement of the piston 44 to reduce the volume of the chamber 48 and to make a comparable increase in the volume of the chamber 46. Thus, the result is that there is a change from the state in FIGS. 5A and 5B to the state shown in FIGS. 3, 4A and 4B.

During this movement of the piston 44 towards the left as shown in FIG. 3, a specific volume of lubricant contained in chamber 48 is expelled towards the second groove 74 through the third valve 80. An equal volume of lubricant that was contained in groove 74 is pushed into chamber 46 through the fourth valve 82.

On the other hand, the retraction movement of the landing gear has no effect on the lubricant contained in the first groove 28. The non-return valve in the second valve 72 prevents any lubricant contained in chamber 48 from being expelled to the first groove 28.

The lubricant contained in reservoir 30 and in lubrication grooves 28 and 74 is renewed during periodic maintenance operations. Grease nipples 86 and 90 are used for this purpose.

More precisely, when it is required to renew the lubricant, an operator opens the two grease nipples 86 and 90. New lubricant is then injected using the pump through the grease nipple 86. Under the effect of the pump pressure, the new lubricant penetrates into the first groove 28 and then into the chamber 48, opening the non-return valve of the second valve 72. At the same time, used lubricant is expelled from the first groove 28 and the chamber 48 to the second groove 74, through the third valve 80. New lubricant then expels the used lubricant from this second groove 74 into chamber 46, by opening the non-return valve of the fourth valve 82. The used lubricant is then expelled from the chamber 46 towards the outside of the device through the passage 88 and the grease nipple 90. It should be noted that the used lubricant that enters the chamber 46 cannot return into the second groove 28 through the first valve. It is prevented from returning by new lubricant injected under pressure by the grease nipple 86.

All used lubricant is thus expelled and replaced by new lubricant along this path. When a sufficient quantity of new lubricant has been injected, the two grease nipples 86 and 90 close again. The volume of the lubricant depends mainly on the size of the reservoir 30. Lubricant renewal operations may be at longer intervals if the reservoir is larger.

The lubrication device that has just been described with reference to FIGS. 3, 4A, 4B, 5A and 5B has the advantages firstly that it guarantees renewal of the lubricant contained between the ball 22 and the cage 24 of the ball joint, and secondly renewal of the lubricant contained between the ball 22 and the pivot hinge pin 16, during each successive rotation in alternating directions of the said pivot hinge pin 16, corresponding to extension maneuvers of the landing gear before the aircraft lands, and retraction movements of the landing gear into the fuselage after the aircraft takes off.

The embodiment described herein also has the advantage that it enables easy disassembly and reassembly of the lubrication device, when necessary for maintenance operations. Since the device is located in the end part of the pivot hinge pin 16, it may be removed by unscrewing the attachment screws 42 fixing the part 40 onto the said hinge pin, through holes 64 and then by unscrewing the screws 62 fastening the end plate 58 on the cage 24 of the bearing. Reassembly is done by performing the same operations as above in the reverse order. This ease of disassembly and reassembly reduces maintenance time and the resulting costs. It also enables a standard exchange of the lubrication device.

The lubrication device described also has the advantage that it enables renewal of lubricant contained in grooves 28 and 74 from a single reservoir 30 common to the supply circuits to these grooves. Thus, maintenance operations are facilitated, which reduces the duration and cost of these operations, and reduces the aircraft immobilization time.

As already mentioned, the lubrication device according to the invention may be used in all cases in which a ball joint bearing block is capable of supporting a pivot hinge pin or a rotation hinge pin, which moves sufficiently slowly to enable circulation of a high viscosity lubricant such as grease.

What is claimed is:

1. A lubrication device for a ball joint bearing block comprising:
   a pivot hinge pin coupled to a support structure,
   wherein said lubrication device comprises at least one lubrication groove located within said ball joint bearing block,
   a lubricant reservoir connected to ends of said groove by a closed circuit,
   a pumping means adapted to circulate the lubricant in said circuit between the reservoir and the groove; and
   an actuation means for activating the pumping means under the effect of a rotation movement of the pivot hinge pin to force the lubricant to circulate inside said groove when a rotation movement of the pivot hinge pin occurs.

2. Lubrication device according to claim 1, in which the device comprises at least two lubrication grooves and means of cyclically distributing the lubricant to each of the said grooves, during successive rotation movements of the pivot hinge pin.

3. Lubrication device according to claim 2, in which the pumping means comprise a piston free to move along a given direction inside the lubricant reservoir (30), in order to divide the lubricant reservoir into two chambers with variable volumes.

4. Lubrication device according to claim 3, in which a first of the said chambers is connected to a first end of a first groove through a first valve, the second chamber is connected to the second end of the first groove through a second valve provided with non-return means, the second chamber is connected to a first end of a second groove through a third valve and the first chamber is connected to the second end of the second groove through a fourth valve provided with non-return means, the first, second, third and fourth valves forming the said means of distributing the lubricant.

5. Lubrication device according to claim 4, in which the ball joint bearing block comprises a ball joint cage, a ball joint ball installed in the ball joint cage and the said pivot hinge pin which passes through a reaming formed in the ball of the ball joint, the first groove being formed between the ball joint cage and the ball joint ball, and the second groove being formed between the ball joint ball and the pivot hinge pin.

6. Lubrication device according to claim 5, in which first leak tightness means are provided between the ball joint cage and the ball joint ball, on each side of the first groove, and second leak tightness means are provided between the ball joint ball and the pivot hinge pin on each side of the second groove.

7. Lubrication device according to claim 4, in which a passage for injection of new lubricant connects a first grease nipple to the first end of the first groove and a passage for expulsion of used lubricant connects the first chamber to a second grease nipple.

8. Lubrication device according to any one of claim 3, in which the volume of the two chambers is variable, and these chambers are connected to a compensation chamber containing lubricant under pressure.

9. Lubrication device according to claim 3, in which the lubricant reservoir and the moving piston are housed inside the pivot hinge pin such that a center line is common with the center line of the pivot hinge pin.

10. Lubrication device according to claim 9, in which the means of actuating the pumping means comprise a connecting rod, a first end of which is articulated on the piston at an eccentric location with respect to the said common center line and the second end of which is articulated on a fixed structure at a location that is also offset from the said common center line.

11. Lubrication device according to claim 4, in which the pivot hinge pin forms part of a landing gear of an aircraft.

12. Lubrication device according to claim 11, in which successive extension and retraction operations of the landing gear cause successive rotations of the pivot hinge pin in two directions, which has the effect of injecting lubricant alternately into the first groove and into the second groove.

13. Lubrication device according to claim 1, in which the lubricant is grease.

* * * * *